UNITED STATES PATENT OFFICE.

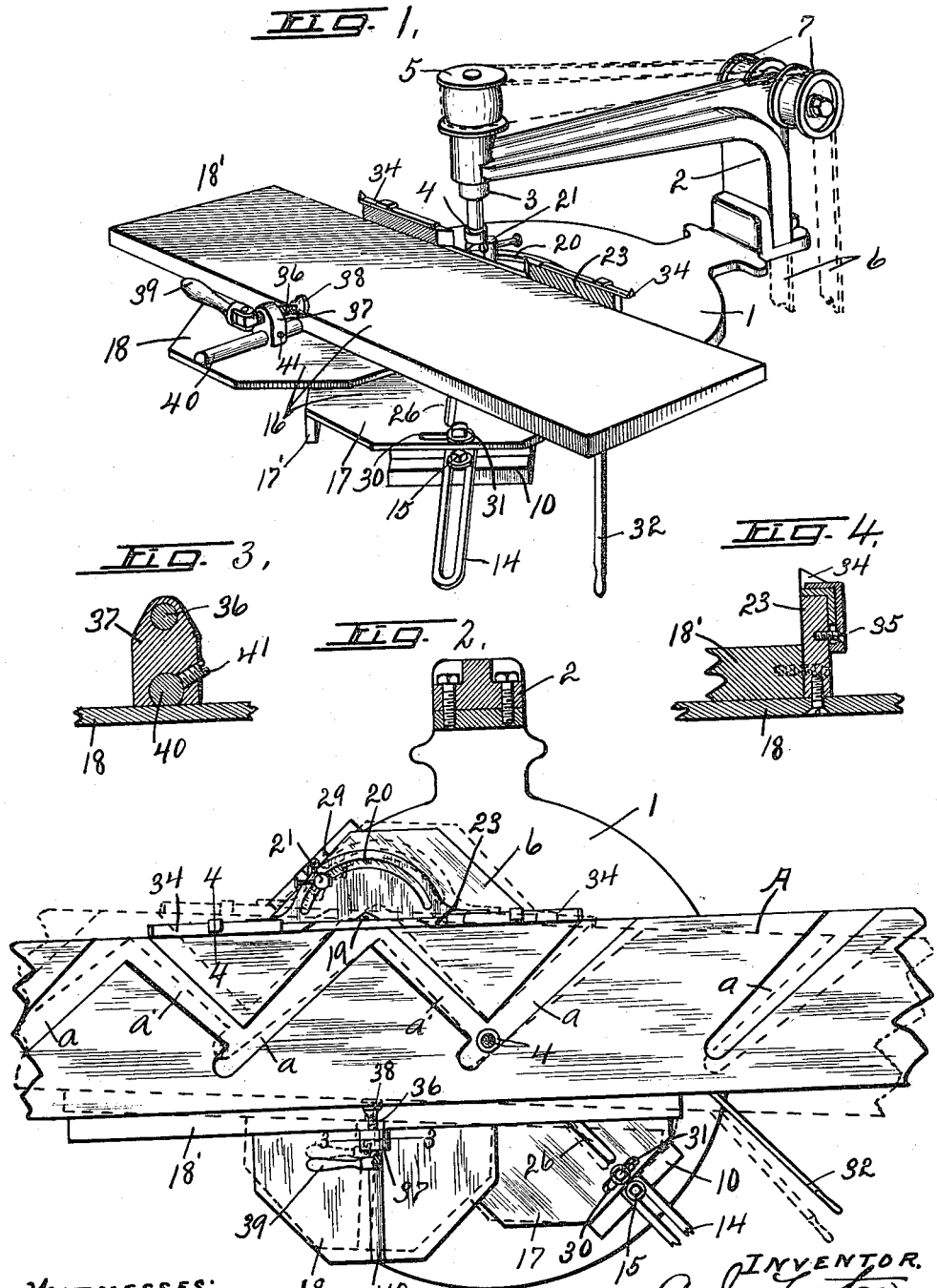

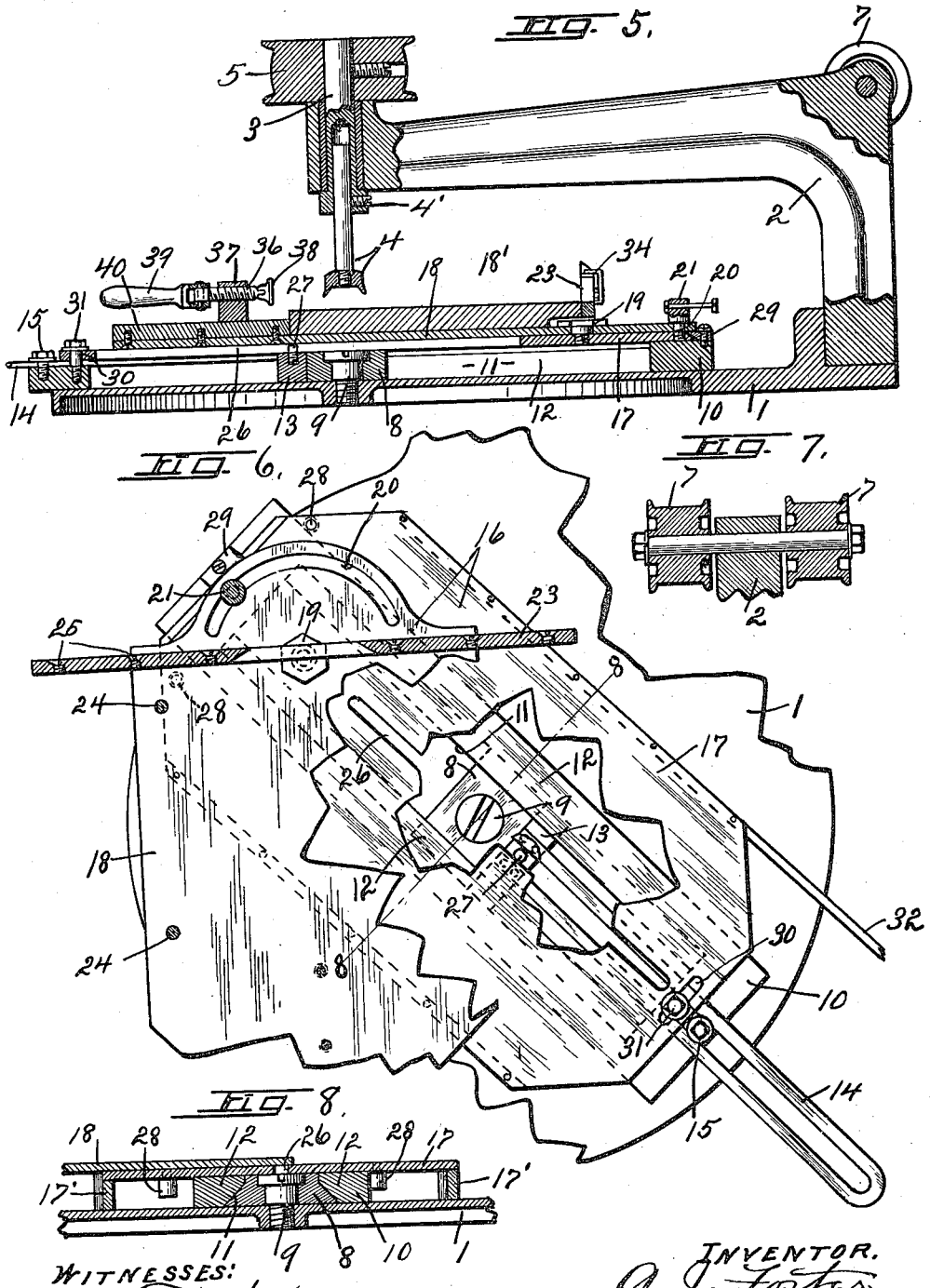

ALVAH JUDSON FOSTER, OF SYRACUSE, NEW YORK.

ROUTING-MACHINE.

1,154,752.

Specification of Letters Patent.

Patented Sept. 28, 1915.

Application filed August 10, 1914. Serial No. 856,026.

*To all whom it may concern:*

Be it known that I, ALVAH J. FOSTER, a citizen of the United States, and resident of Syracuse, in the county of Onondaga, in the State of New York, have invented new and useful Improvements in Routing-Machines, of which the following, taken in connection with the accompanying drawings, is a full, clear and exact description.

This invention relates to certain improvements in routing machines as applied more particularly to cutting grooves in stair stringers for receiving the ends of the risers and treads. In many instances, these stringers are of considerable length and transverse width while the grooves therein for receiving the risers and treads are cut at an angle of 45° more or less to the longitudinal edges of the stringer and at right angles to each other so that if the work-supporting table had only one direction of movement in cutting the grooves, it would be necessary to swing the stringer through an arc of at least 90° which would require a relatively large area of floor space and would render the use of the machine prohibitive in small rooms or places where the installation of other machines would interfere with its operation and would also add materially to the expense of such operation where floor space is a factor of consideration.

The main object, therefore, of my present invention is to materially reduce the floor space required for the installation and operation of this class of machines by providing means whereby grooves for receiving the risers and treads may be cut at the desired angle without materially changing the direction of extension of the stringer so that the machine may be installed close to a wall or partition or the stringer directed lengthwise between other machines during the process of cutting the grooves therein throughout its length without in any way interfering with said wall or other machines.

Another object is to provide simple means for easily and quickly adjusting the stringer support relatively to the cutter so as to give the proper rake to one side of each groove for receiving the usual wedges by which the exposed joints are made tight.

A further object is to provide means for automatically limiting the amount of movement of the stringer-supporting carriage relatively to the cutter for cutting the grooves uniform lengths.

Other objects and uses relating to specific parts of the machine will be brought out in the following description.

In the drawings:—Figure —1— is a perspective view of a machine embodying the various features of my invention. Fig. —2— is a horizontal sectional view through the router supporting bracket just above the table upon which the stringer is supported. Figs. —3— and —4— are enlarged detail sectional views taken respectively on lines 3—3 and 4—4 Fig. —2—. Fig. —5— is a transverse vertical sectional view from front to rear of the same machine except that the table sections and sliding carriage therefor are brought into parallelism with the bracket carrying the routing tool. Fig. —6— is an enlarged top plan, partly broken away, of the relatively adjustable table sections and carrier therefor showing also the stringer guide, limiting stop, and a portion of the main supporting bed. Fig. —7— is a detail sectional view through the belt idlers and adjacent portion of the bracket on which they are mounted. Fig. —8— is an enlarged vertical sectional view through the central portion of the table sections and carriage taken on line 8—8 Fig. —6—.

This machine comprises a substantially horizontal bed —1— having a bracket —2— rising from the rear side thereof and extending forwardly over the center of the bed for receiving and supporting a rotary vertical shaft —3— carrying a routing tool —4— and a pulley —5—, the latter being adapted to be connected by a belt —6— passing over idlers —7— on the rear end of the bracket —2— for connection with any available source of power not shown. The routing tool —4— may be of any suitable construction for cutting grooves as —a— and —a'— in a stringer —A— or for any other similar purpose, and is adjustably mounted in the spindle —3— to cut the grooves to the desired depth and held in its adjusted position by a set screw —4'—, the size of the tool depending upon the width of the groove to be cut. The main body of the bed —1— is circular and concentric with the produced axis of the routing tool —4— or vertical shaft —3— and its upper face is substantially flat and disposed in a horizontal plane a sufficient distance below the horizontal portion of the bracket —2— to permit free operation of the stringer-supporting table and carriage therefor together with the stringer which may be mounted upon said table.

A guide plate —8— is pivotally secured by a bolt —9— to the bed plate —1— co-axial with the axis of the routing tool —4— and its spindle —3— so as to swing about said axis in a horizontal plane upon the upper surface of the bed plate for guiding a diametrically extending and radially movable carriage —10— which consists of an elongated substantially rectangular plate having a central lengthwise slot —11— forming opposite parallel bars —12— at opposite sides of the pivotal bolt —9— engaging opposite ends of the guide plate —8— and also resting upon the upper surface of the bed —1— as shown more clearly in Figs. —5— and —8—. The opposite edges of the guide plate —8— and corresponding inner edges of the bars —12— of the carriage —10— are beveled to form ways along which the carriage may move longitudinally transversely of the cutter for cutting the grooves and at the same time establishes connection between the guide plate —8— and carriage whereby the carriage and work supporting table mounted thereon may be adjusted rotarily to any angle about the axis of the pivotal bolt —9— or spindle —3— most convenient for the manipulation of the stringer or other work in the progressive operations of cutting the grooves therein without interfering with other objects in the vicinity of the machine or disturbing the angular relation between the work supporting table and carriage when the table is once adjusted for cutting the grooves in parallelism.

In Fig. —1— the carriage and work supporting table mounted thereon are shown in their extreme forward positions ready to begin the cutting of one of the grooves although the stringer is omitted while in Figs. —2—5—6 the same parts are shown in their extreme rearward position or at the end of the cut of one of the grooves, the carriage —10— being provided with a longitudinally adjustable stop —13— coöperating with the front face of the guide plate —8— to limit the rearward movement of the carriage and thereby gage the length of the groove cut by the routing tool —4— as the carriage with the stringer on the work table is moved from the position shown in Fig. —1— to the position shown in Fig. —2—, said stop being provided with a slotted handle —14— extending forwardly some distance beyond the front edge of the carriage and its supporting bed —1— and is clamped in its adjusted position to said carriage by means of a clamping bolt —15— as shown more clearly in Figs. —5— and —6—.

The work supporting table as —16— comprises a pair of substantially flat elongated plates —17— and —18— and a table top —18'— all disposed in horizontal planes one above the other and above the carriage —10—, the plate —18— being pivoted near its rear end to the corresponding end of the plate —17— by means of a pivotal bolt —19— so as to permit it to be adjusted rotarily to any angle relatively to the plate —17— and carriage —10— corresponding to the angle at which the groove is to be cut relatively to the edge of the stringer and is provided with a circular groove —20— concentric with the pivot —19— for receiving a clamping bolt —21— by which it may be held in its adjusted position, said plate —18— being also provided near its rear end with an upstanding guide flange —23— at right angles thereto to guide the stringer as it is shifted longitudinally in the operation of cutting the grooves progressively therein. The guide flange —23— is so arranged that its front face is disposed in substantially the same vertical plane as the axis of the pivot —19— which in turn is located in the vertical plane of the longitudinal center of the carriage passing through the axis of the pivot —9— about which the carriage is movable and it therefore follows that the point of intersection of the axis of the pivot —19— with the front face of the guide flange —23— must move with the carriage backward and forward in said plane and that the angle formed by a straight line drawn through the axes of the pivots —9— and —19— and the front face of the guide flange —23— determines the angle at which the grooves are cut into the stringer relatively to the lengthwise edge thereof. This angle, may however be changed at will by simply loosening the clamping bolt —21— and rocking the plate —18— about its pivot —19— until the guide flange —23— is brought to the desired angle relatively to the line of movement of the carriage after which the clamping bolt —21— may be retightened to hold the plate —18— in its adjusted position.

The table top —18'— upon which the work is supported, is elongated transversely of the plate —18— to which it is secured by suitable fastening means as screws —24— said table top being also secured to the guide flange —23— by screws shown by dotted lines in Fig. —4— passing through apertures —25— in the guide flange. The plate —17— carrying the plate —18— is in turn mounted directly upon the carriage —10— so as to be movable back and forth therewith but has independent lateral movement thereon for the purpose of cutting the backs and rear sides of the grooves at an angle with their opposite sides for permitting the use of the usual wedges in making tight joints between the risers and treads and stringers. For this purpose, the plate —17— is provided with a central lengthwise slot —26— for receiving a pivotal pin —27— on the stop —13— so that when the carriage and table mounted thereon are moved to the extreme limit of their rearward movement as determined by the engagement of the stop —13— with the guide plate —8— the entire table including the plates —17— and —18— and top —18'— may be rocked laterally about the axis of the pivotal pin —27— independently of the carriage —10— from the position shown by full lines Fig. —2— to the position shown by dotted lines in the same figure so that when the carriage with the table and stringer mounted thereon is returned to its starting position, one side of the groove will be cut away still more and at an angle to the opposite side for the purpose previously described. The lateral movement of the plate —17— and remaining portions of the table carried thereby is limited by stop pins —28— projecting downwardly from the rear end of the plate at opposite sides of the adjacent end of the carriage as shown more clearly in Fig. —6—.

In order that the plate —17— together with other parts of the work supporting table may be moved positively backward and forward with the carriage —10— in the operation of cutting the grooves in the stringer and at the same time be held against upper displacement from said carriage, the rear end of said plate is in sliding engagement with an over-hanging guide flange —29— at the adjacent end of the carriage as shown more clearly in Fig. —5— while the other end of the same plate is provided with a transverse slot —30— for receiving a guide bolt —31— which is screwed into the underlying portion of the carriage and also passes through the slot in the stop-operating arm —14—. This guide bolt —31— may be left sufficiently loose to allow the lateral movement of the plate —17— at any time about the axis of the pivotal pin —27— but may be tightened if necessary to hold the plate and remaining portions of the work supporting table in its adjusted position. The plate —17— extends equal distances to opposite sides of the carriage and its longitudinal edges are provided with depending flanges —17'— bearing upon the upper face of the bed plate —1— to afford additional support for the superposed load, one of the flanges being extended forwardly some distance beyond the front edge of the bed plate to form a handle —32— by which the plate —17— may be conveniently shifted laterally.

Guide flange —23— on the table plate —18— is provided with adjustable gages —34— for determining the distances between the centers of the grooves along the adjacent edge of the stringer, said gages being held in their adjusted positions by clamping screws —35—.

The means for holding the work in operative position upon the table top —18— during the cutting operation consists of a clamping screw —36— engaged in a threaded lug —37— and having its inner end provided with a swivel head —38— for engaging the adjacent edge of the stringer and forcing said stringer against the guide flange —23—, the outer end of the screw —36— being provided with a hand piece —39— pivoted thereto and by which it may be operated. The lug —37— is adjustable at right angles to the flange —23— allowing a suitable guide way —40— to attach the clamping device for stringers of different widths, said lug being held in its adjusted position by a set screw —41—.

In operation, the plate —18— is adjusted to the desired angle relatively to the line of movement of the carriage —10— for cutting the grooves in the stringer at a corresponding angle relatively to the edge thereof; the stringer is then placed upon the table top —18'— and clamped against the guide flange —23— by the screw —36— it being understood that the carriage together with the plate —17— and other portions of the table thereof have been previously adjusted by turning those parts about the pivot —9— until the stringer is free to shift lengthwise for successive cutting operations without interfering with adjacent objects in the vicinity of the machine and that those parts have also been shifted to their starting positions as shown in Fig. —1— and that the stop —13— has been adjusted to allow the grooves to be cut only to the desired length whereupon the carriage may be moved rearwardly by hand for cutting the main portion of the groove full length thus bringing the routing tool to the position shown in Fig. —2— after which the plate —17— may be shifted laterally by means of the handle —32— until limited by one of the stop pins —28— after which the carriage may be returned forwardly thereby causing the routing tool to cut one side of the groove at an angle to the opposite side to produce the desired tapering groove, these operations being repeated for each similar groove throughout the length of the stringer while the machine is adjusted for cutting those particular grooves. The remaining grooves are cut in the same manner after the plates —17— and —18— have been re-adjusted to correspond to the angles at which those grooves are to be cut relatively to the longitudinal edges of the stringer.

What I claim is:

1. In a routing machine, the combination of a rotary grooving tool, a work-supporting table movable radially to the axis of said tool and adjustable about separate axes parallel with the first-named axis, but at different distances therefrom to cause one side of the groove to be cut at an angle to the other side.

2. In a routing machine, the combination of a rotary grooving tool, a carriage slidable radially to the axis of the tool, a plate mounted on the carriage to swing about an axis parallel with, but a short distance to one side of the first-named axis, and a separate plate mounted on the first-named plate to swing about an axis parallel with, but some distance from both of the other axes, and provided with means for supporting the work.

3. In a routing machine, the combination of a rotary grooving tool, a main supporting frame, a carriage guide journaled on the frame co-axial with the tool, a carriage slidable radially of and upon said guide and provided with an adjustable stop coöperating with the guide for limiting the movement of the carriage in one direction, a plate mounted on the carriage to move therewith and fulcrumed on the adjustable stop to swing laterally, and a separate plate journaled on the first-named plate to swing laterally relatively to the carriage and provided with means for supporting the work.

4. In a routing machine, the combination of a rotary routing tool, a carriage movable radially of the axis of the tool, a support for the carriage, a plate mounted on the carriage to move therewith and having an independent lateral movement about an axis parallel with but at one side of the axis of the tool and a work supporting table pivoted to the first named plate to swing about an axis also parallel with and at one side of the axis of the tool and provided with a guide flange.

5. In a routing machine, the combination of a main supporting bed having an overhanging bracket, a vertical spindle journaled on the bracket and provided with a routing tool, a carriage guide journaled on the bed co-axial with the spindle, a carriage movable radially of and upon the guide, a stop adjustably mounted on the carriage and coöperating with the guide to limit the movement of the carriage in one direction, and a work holder mounted on the carriage and provided with a work-supporting plate adjustable about an axis parallel with, but some distance to one side of the axis of the tool.

6. In a routing machine, a main supporting bed having an overhanging bracket and a rotary spindle journaled on the bracket and provided with a routing tool, in combination with a carriage guide journaled on the bed co-axial with the spindle, a carriage movable along and upon the guide radially to the axis and provided with a pivotal pin relatively near, but at one side of and parallel with said axis, a plate mounted on the carriage to move therewith and provided with a lengthwise slot for receiving said pin, said plate having a limited rocking movement about the axis of said pin, and a separate plate pivoted to the first-named plate at the opposite side of the axis of the tool a distance relatively greater than that between the axis of the tool and pin to permit the second-named plate to swing laterally to different angles relatively to the carriage, said second plate being provided with means for supporting the work.

In witness whereof I have hereunto set my hand this 5th day of August 1914.

ALVAH JUDSON FOSTER.

Witnesses:
 H. E. CHASE,
 VIOLA HOWLAND.

Copies of this patent may be obtained for five cents each, by addressing the "Commissioner of Patents, Washington, D. C."